United States Patent [19]
Colandene et al.

[11] Patent Number: 6,069,358
[45] Date of Patent: May 30, 2000

[54] PULSED OPTICAL THREAT DETECTION

[75] Inventors: Thomas M. Colandene, Burke; Jaime Sonstroem, Springfield, both of Va.

[73] Assignee: The United States of America as represented by the Secretary of the Army, Washington, D.C.

[21] Appl. No.: 09/053,687

[22] Filed: Apr. 2, 1998

[51] Int. Cl.[7] ...................................................... G01J 5/06
[52] U.S. Cl. ........................ 250/334; 250/330; 250/332
[58] Field of Search ................................... 250/330, 332, 250/334

[56] References Cited

U.S. PATENT DOCUMENTS 5,629,520  5/1997  Sonstroem .............................. 250/330

*Primary Examiner*—Constantine Hannaher
*Assistant Examiner*—Otilia Gabor
*Attorney, Agent, or Firm*—Milton W. Lee; John E. Holford; Alain L. Bashore

[57] ABSTRACT

A technique for internal forward looking infrared (FLIR) system detection of laser pulses. For scanning systems image pixel output of each frame is sampled as image data which is used to determine a pattern of saturated image pixels. The pattern of saturated image pixels is compared to predetermined laser pulse patterns and is then analyzed to determine if a laser pulse was detected. For staring systems, the patterns are compared to previous and following frames to determine if short lived large changes occur to determine if a laser pulse was detected.

4 Claims, 4 Drawing Sheets

PULSED OPTICAL THREAT DETECTION

DESCRIPTION

BACKGROUND OF THE INVENTION

1. Field of the Invention

The present invention generally relates to optical emission detection methods and more specifically, to laser pulse detection methods in FLIR systems.

2. Description of Prior Art

On the modern battlefield one of the most dangerous threats to optical radiation sensor systems is the pulsed laser. The detector surface of this type of sensor is most vulnerable to such threats since it is this surface that all incoming radiation impinges upon. For the forward looking infrared (FLIR) system the detector surface is the focal plane array (FPA). The previous method to detect laser pulses in FLIR systems was to provide several detectors external to the FPA specifically designed to detect laser pulses. The external detectors have lower sensitivity than the FPA, have noise problems, and are an additional cost.

While the prior art has reported using separate detectors none have established a basis for a specific technique that is dedicated to the task of resolving the particular problem at hand. What is needed in this instance is an internal detection technique of laser pulse that overcomes the cost, noise and sensitivity problems of the prior art external sensor detection method.

SUMMARY OF THE INVENTION

It is therefore one object of the invention to provide a technique for internal FLIR system detection of laser pulses.

According to the invention, a technique is disclosed for internal forward looking infrared (FLIR) system detection for laser pulses that makes use of the unique effect laser pulses have upon the FLIR image forming system. A FLIR system includes a focal plane (FPA) made up of individual detector elements in a FPA pattern for detection of incoming infrared scene radiation. The infrared image is scanned across the array and the FPA to outputs the detected radiation in the form of image data. At least a portion of the image pixel output from the FLIR system is sampled as each image is formed. A pattern of saturated image pixels is determined by identifying which image pixels exceed a predetermined intensity. The pattern of saturated image pixels is compared to the known layout of the FPA pattern. The correlation of the saturated image pixel pattern to the know FPA pattern is analyzed to determine if a laser pulse caused the saturated image so that a detection signal can be output.

The invention technique of using the FLIR system FPA provides detection sensitive enough to identify the presence of pulsed lasers at fluences lower that those required to damage the FPA. Therefore a warning can be issued or a countermeasure employed before the pulsed laser beam can be brought fully to bear on the sensor system, protecting the FPA from damage.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
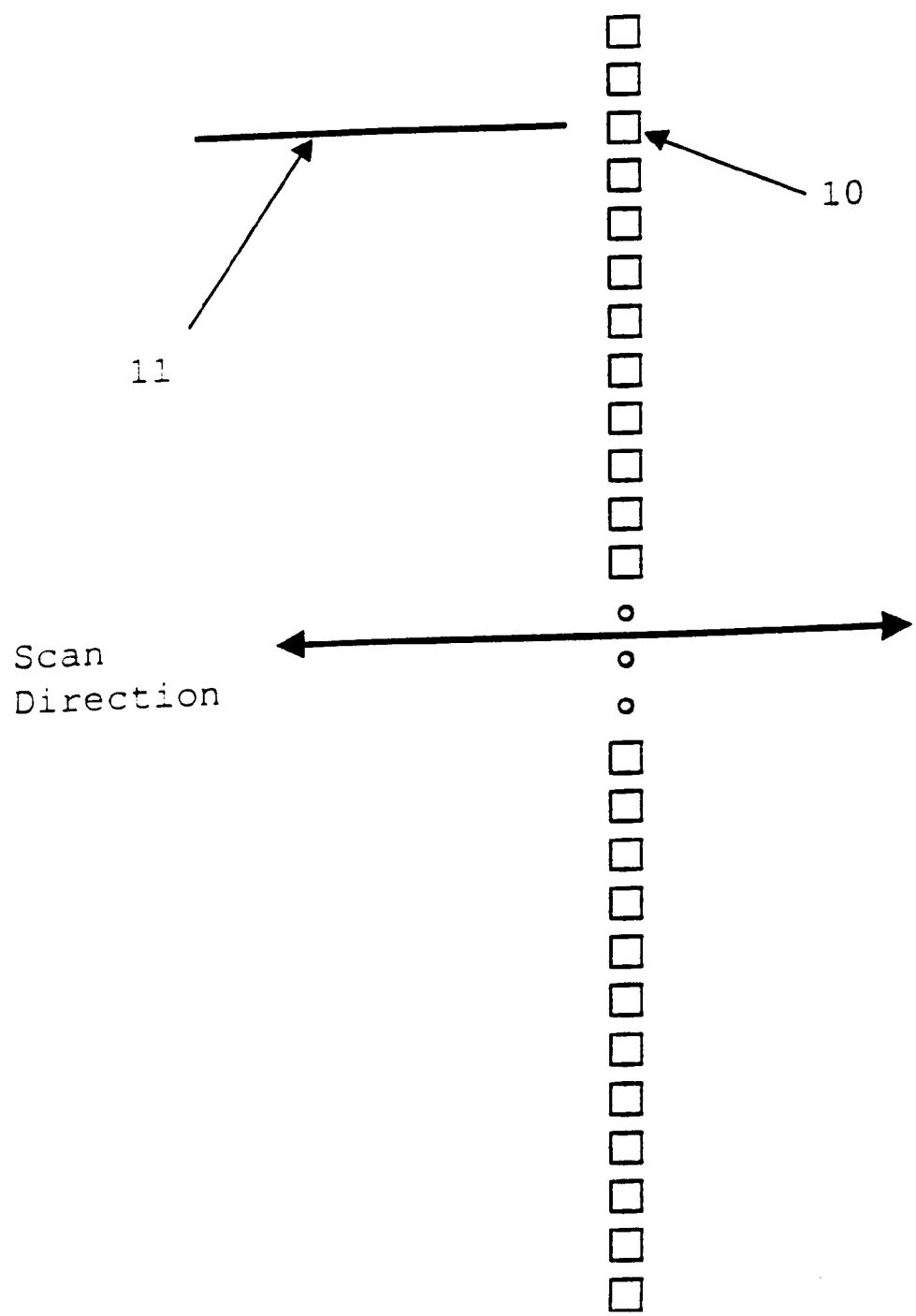
FIG. 1 is the FPA layout for a first generation FLIR system.
Figure 2:
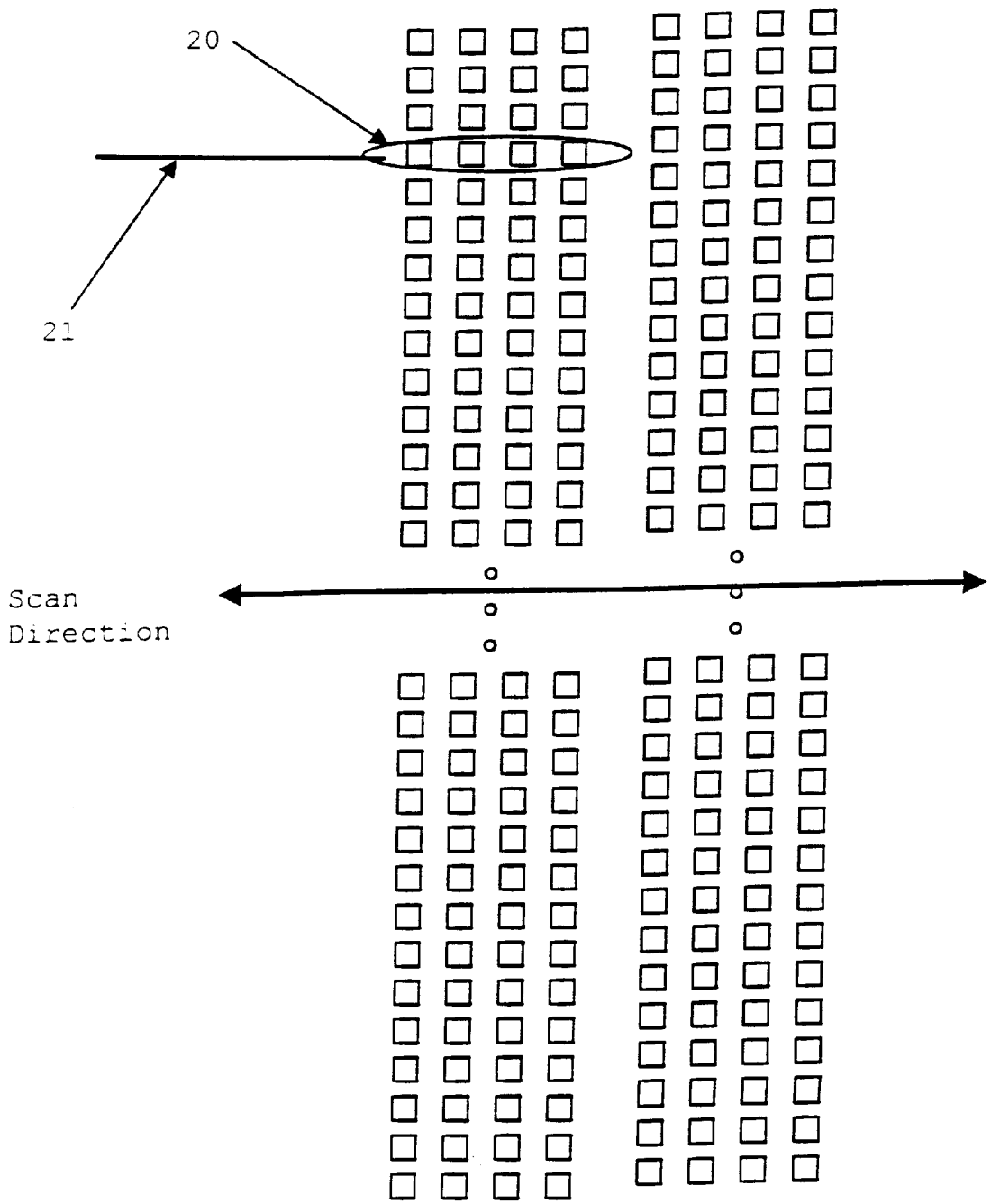
FIG. 2 is the FPA layout for a second generation FLIR system.

Referring now to the drawings, and more particularly to FIGS. 1 and 2 there are shown the FPA layouts for a first and second generation FLIR system respectively. The squares shown in both FIGS. 1 and 2 are representations of individual detector elements of the FPA. In FIG. 1, the detector elements are scanned perpendicular to the detector array. The output of each detector element 10 forms a line 11 in the display image as the infrared scene is scanned across the FPA. The technique illustrated in FIG. 1 is typical for a first generation FLIR system. In FIG. 2 the detector elements are grouped to form individual display pixels, such as group 20, in a staggered array layout. The detector elements shown in FIG. 2. are scanned perpendicular to the FPA axis. Each display pixel is generated after the output of the group of four detector elements are combined by time delay integration (TDI). Each TDI group forms a display line 21 as the infrared scene is scanned across the FPA. The technique illustrated in FIG. 2 is typical for a second generation FLIR system.

Figure 3:
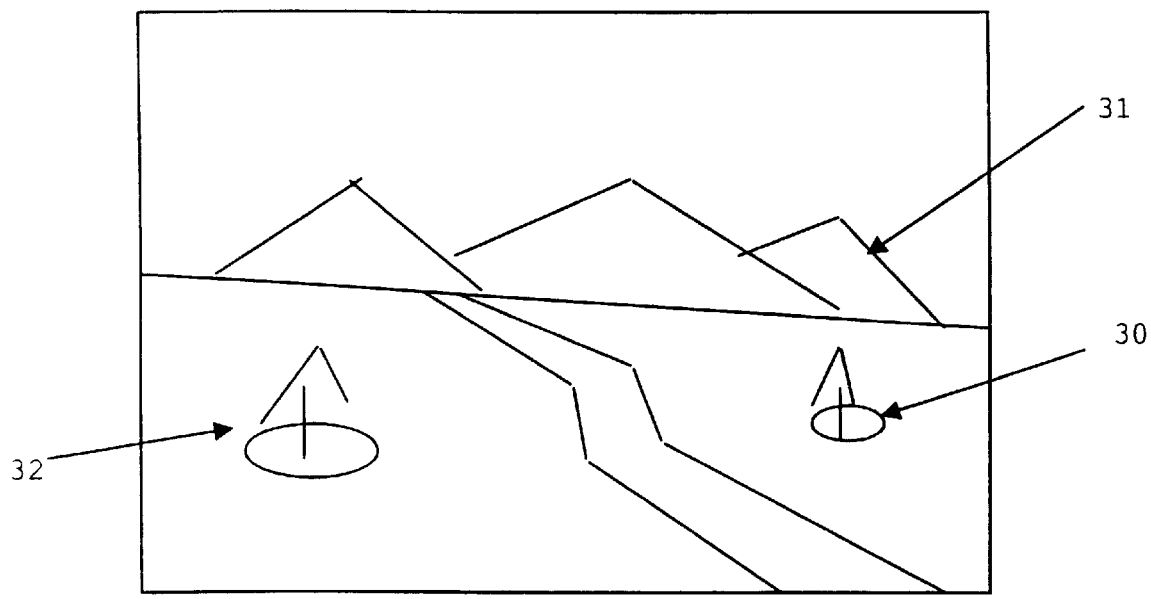
FIG. 3 depicts a normal FLIR system frame display.
Figure 4:
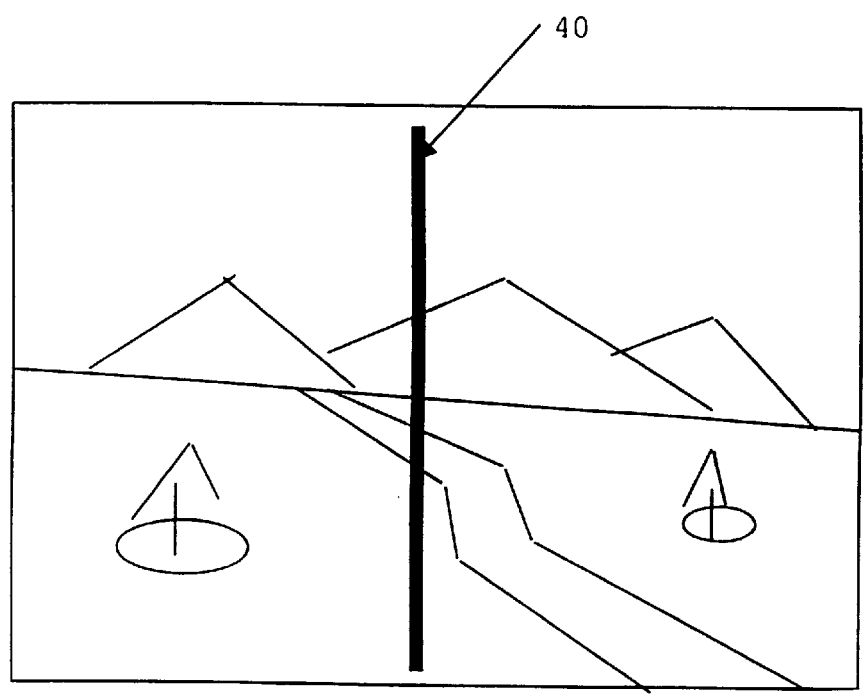
FIG. 4 is the FLIR system frame display for a first generation FLIR system with a pulsed laser effect.
Figure 5:
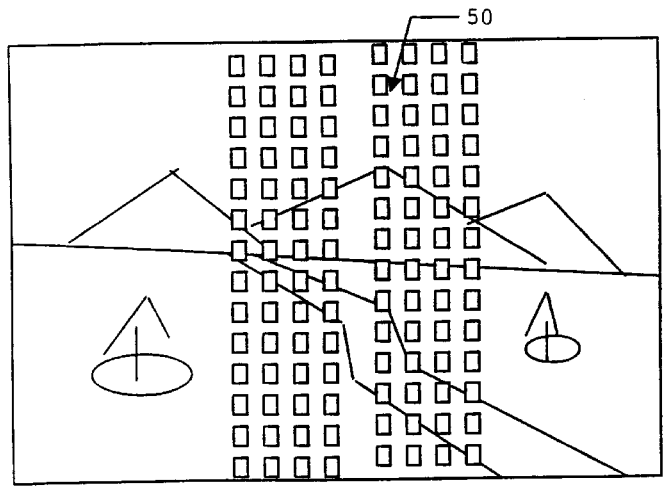
FIG. 5 is the FLIR system frame display for a second generation FLIR system with a pulsed laser effect.

Comparison with the detector layout is utilized by the invention for pulsed laser detection. Pulsed optical illumination of a FLIR system generates a unique pattern in the FLIR display, known as a "display effect" that is detected by the technique of the invention. The pattern generated is determined by the layout of the FPA, such as those layouts shown in FIGS. 1 and 2. FIG. 3 depicts a normal FLIR system display frame, where display effects 30, 31, and 32 are background scenery as seen by the FLIR system. The display is the result of the aggregation of all display lines produced. FIG. 4 depicts a first generation FLIR system frame display with display effect 40. Display effect 40 is seen as a line which correlates with the detector layout in FIG. 1. FIG. 5 depicts a second generation FLIR system frame display with display effect 50. Display effect 50 is seen as two staggered columns of the TDI elements which correlates with the detector layout in FIG. 2. Display effects 40 and 50 are the resultant pixel intensity overload, known as "saturation" which is caused by pulse laser illumination. To detect the pattern, and thence take an appropriate countermeasure, comparison is made between the known pattern and the display.

Figure 6:
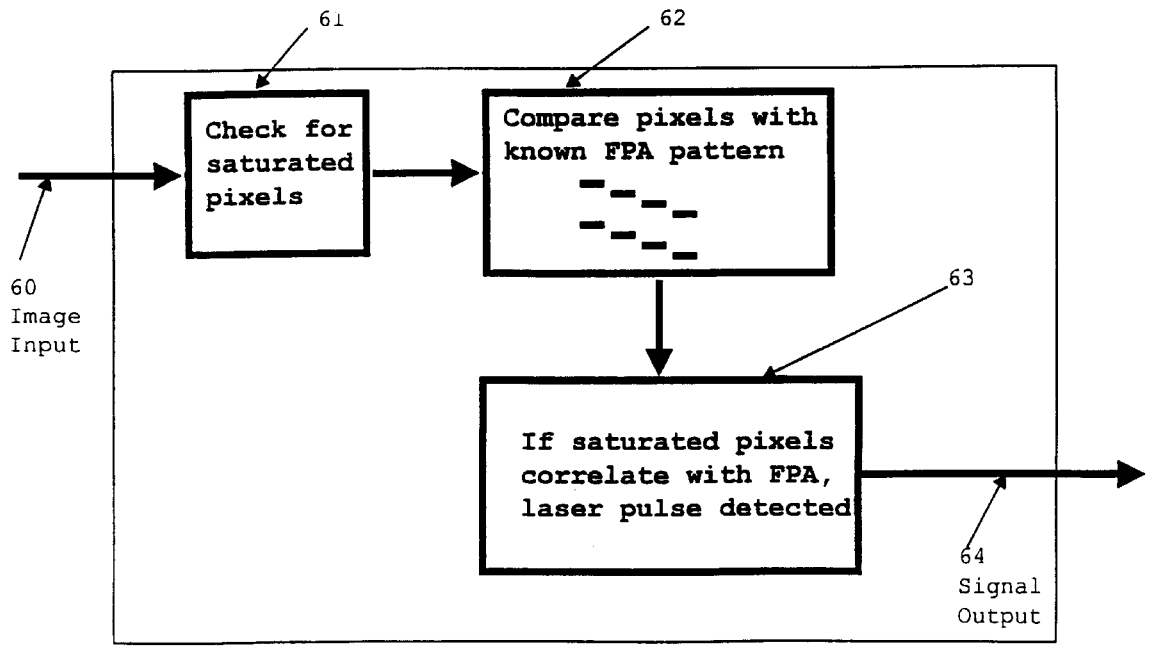
FIG. 6 is a block diagram showing the technique of the invention.

FIG. 6 shows a block diagram of the technique of the invention. Input 60 is image data gathered by the FLIR system. The image data is sent to analyzer 61 to threshold the image data to determine which pixels are saturated. Output from analyzer 61 in the form of a pattern of saturated pixels is sent to comparator 62 for correlation against the known pattern of the FPA layout. Comparator 62 scores the correlation between each input pixel and the known FPA pattern. High correlation between pixels (both input and known have the same gray level) are given high scores, differences between pixels receive low correlation scores. The total score output from comparator 62 is sent to analyzer 63 to threshold the level of correlation between the saturated pattern and the known FPA layout. The display effects of a pulsed laser will receive high correlation scores that exceed a predetermined threshold in analyzer 63 that indicate that a laser pulse was incident on the FLIR system. Upon laser pulse detection output 64 would be sent to further electronics for appropriate action, such as a warning indicator or insertion of a protective filter.

The technique may use electronic circuitry such as a frame grabber, threshold circuits and comparitor circuits. It is understood that the invention is not limited to a particular electronic circuitry, and that image processing algorithms may be used as equivalent to a particular circuitry envisioned. Each frame of image data must be checked since the pulse effects may only last for one frame. To analyze the data real time the system depicted in FIG. 6 must be fast enough and have capacity to search each frame for laser pulses. These requirements could be reduced by sampling only portions of each image frame. Since second generation FPAs use TDI, these FPAs would provide a better statistical probability to detect laser pulses due to coincidence of the pulse on the TDI group of elements. Thus even smaller portions of second generation image frames could be sample for detection of laser pulses, reducing complexity.

The technique described above can be applied to any electronic viewing device that scans a scene across a focal plane array that is susceptible to pulsed radiation. Types of imaging systems besides 8–12 micrometer FLIRs include: 3–5 micrometer systems, line scan CCDs and video systems.

A technique for staring systems (fully two dimensional FPAs) would check for coincidence of abrupt short lived changes in the detector elements of the FPA from one frame to the next. This technique could also be realized through electronic circuits or an image processing algorithm. Multiple small portions of the image scene could be sampled to reduce complexity and processing for real time pulse detection. Again each image frame would need to be analyzed so as not to miss a pulse event.

While this invention has been described in terms of preferred embodiment consisting of the apparatus and technique disclosed, those skilled in the art will recognize that the invention can be practiced with modification within the spirit and scope of the appended claims.

Having thus described my invention, what we claim as new and desire to secure by Letters Patent is as follows:

1. A technique for internal forward looking infrared (FLIR) system detection of laser pluses wherein the system includes a focal plane array (FPA) made up of individual detector elements in a FPA pattern for detection of incoming infrared radiation, where the incomming infrared radiation is scanned across the FPA and the FPA outputs detected radiation in the form of image data output, the technique comprising the steps of:

sampling the image data output from the FLIR system as each image is formed to output sampled data;

determining from said sampled data image pixels that exceed a predetermined intensity as a pattern of saturated image pixels;

comparing said pattern of saturated image pixels to a standard as a compared image pixel pattern;

analyzing said compared image pixel pattern to a correlation technique whereby above a predetermined level of correlation results in a laser pulse being detected and a detection signal output.

2. The technique for internal forward looking infrared (FLIR) system detection of laser pluses of claim 1 wherein said standard is a known FPA layout pattern.

3. The technique for internal forward looking infrared (FLIR) system detection of laser pluses of claim 1 wherein said standard is coincidence of abrupt short lived changes in detector elements.

4. The technique for internal forward looking infrared (FLIR) system detection of laser pluses of claim 1 wherein said sampling the image data output further includes sampling a portion of each image frame.

* * * * *